United States Patent
Bingham et al.

(10) Patent No.: US 6,327,549 B1
(45) Date of Patent: Dec. 4, 2001

(54) DIFFERENTIAL CORRECTION METHOD AND APPARATUS

(75) Inventors: Russell D. Bingham, Knoxville; Dale A. Gedcke, Oak Ridge; Rex C. Trammell, Andersonville, all of TN (US); Timothy R. Twomey, Berkshire (GB); Ronald M. Keyser, Clinton, TN (US)

(73) Assignee: PerkinElmer, Inc., Oak Ridge, TN (US)

(*) Notice: Subject to any disclaimer, the term of this patent is extended or adjusted under 35 U.S.C. 154(b) by 0 days.

(21) Appl. No.: 09/614,273

(22) Filed: Jul. 12, 2000

Related U.S. Application Data

(60) Provisional application No. 60/161,280, filed on Oct. 25, 1999.

(51) Int. Cl.$^7$ .......................... G06F 101/14; G06F 15/00
(52) U.S. Cl. .......................... 702/180; 702/104; 356/326
(58) Field of Search .......................... 702/22, 28, 30–32, 702/57, 66–69, 76–80, 108, 124–126, 172, 177–181, 183, 187, 189; 250/252.1, 370.06, 369; 356/326, 328; 378/53, 70, 71, 82, 83

(56) References Cited

U.S. PATENT DOCUMENTS

| | | |
|---|---|---|
| 4,476,384 | 10/1984 | Westphal .......................... 250/252.1 |
| 4,661,918 | 4/1987 | Buschmann et al. . |
| 5,050,065 | 9/1991 | Dartois et al. . |
| 5,349,193 | 9/1994 | Mott et al. . |
| 5,608,222 | 3/1997 | Hardy, II . |
| 5,884,234 | 3/1999 | Jorion et al. . |

OTHER PUBLICATIONS

Jenkins, Ron et al., *Quantitative X-ray Spectrometry*, Marcel Dekker, New York, 1981.

Harms, J., *Nuclear Instruments and Methods*, 53 pp 192–196, North–Holland Publishing Co.,1967.

*Primary Examiner*—Marc S. Hoff
*Assistant Examiner*—Manuel L. Barbee
(74) *Attorney, Agent, or Firm*—Pitts & Brittian, P.C.

(57) ABSTRACT

A differential correction apparatus for use with a spectroscopy device. The spectroscopy device simultaneously produces two histograms corresponding to the spectrum acquired. The first histogram contains the counts recorded by a differential correction method (DCM), giving the best estimate of the counts per channel in the absence of dead time. The second histogram is the error spectrum, giving the variance of the counts in each channel of the first spectrum. The two spectra have the same size, true acquisition time, and energy calibration with the only difference being the number of counts in each channel. By obtaining both histograms, it is possible to both obtain an accurate spectrum when the energy peaks have varying decay times and retain the necessary information about the spectrum to allow the statistical error to be calculated.

15 Claims, 2 Drawing Sheets

DIFFERENTIAL CORRECTION METHOD AND APPARATUS

CROSS-REFERENCE TO RELATED APPLICATIONS

This application claims the benefit of U.S. Provisional Application No. 60/161,280, filed Oct. 25, 1999.

STATEMENT REGARDING FEDERALLY SPONSORED RESEARCH OR DEVELOPMENT

Not Applicable.

BACKGROUND OF THE INVENTION

1. Field of Invention

The invention relates to a system for accurately determining the true counting rate of energy peaks in a radiation spectrum measured by a spectrometer. More specifically, the system extrapolates the live count based upon the length of the inactive period of the spectrometer to create a histogram representative of the radiation spectrum measured by the spectrometer.

2. Description of the Related Art

Spectroscopy systems are used to obtain the spectrum of a radiation field. The radiation might be charged particles, X-rays, or gamma rays. The invention disclosed herein is discussed in terms of a gamma ray spectrometer but applies to other spectrometers as well. The spectrum is a plot of measured counts as a function of the energy of the gamma ray as determined by the detector. Monoenergetic gamma rays produce peaks in the spectrum. The centroid of the peak denotes the energy of the gamma ray. The number of counts in the peak, suitably corrected for the detector efficiency, the counting geometry, and the counting losses in the spectrometer, gives the counting rate, or activity, of the gamma ray.

The spectrum is collected by measuring the energy of gamma ray photons one at a time. After amplification and filtering, the amplitude of the detector pulse is converted to a digital value. The measured value, proportional to the photon energy, is used to point to a location in a histogram memory array. The memory location, called a channel, is used to store the counts for a narrow range of energies. The digitized amplitude points to the appropriate channel and the contents of that channel are incremented for each count.

All spectrometers have some effective dead time per pulse that causes the measured number of counts to be less than the true number observed by the detector. Reducing the spectrometer dead time can reduce the errors caused by counting losses but generally makes the energy measurement less precise. Usually the dead time is adjusted to a value that gives adequate energy resolution and some method of correcting for the counting losses is applied.

The simplest correction scheme uses a true timer and a live timer. The true timer counts a precision oscillator during the differential data acquisition. The live timer counts the same oscillator but is gated off while each pulse is processed. The area of the peak divided by the live time is the calculated count rate. This method can give accurate results if the time during which the live timer is gated off accurately reflects the dead time of the spectrometer. This method is well known in the art, as disclosed by R. L. Chase, *Nuclear Pulse Spectrometry*, McGraw-Hill, New York, 1961.

One very accurate technique for implementing a live timer is the Gedcke-Hale method. Jenkins, Gould, and Gedcke describe the Gedcke-Hale method in Chapter 4 of the text by Ron Jenkins, R. W. Gould, Dale Gedcke, *Quantitative X-ray Spectrometry*, Marcel Dekker, New York, 1981. Gedcke noted that, statistically, the dead time per pulse is twice the time-to-peak of the pulse plus the time required to return to baseline. In order to doubly weight the time-to-peak of the pulse, the Gedcke-Hale method counts the live timer backward during the rising part of the pulse then gates it off during the falling time.

Live timer techniques, such as Gedcke-Hale, give accurate results if the counting rate throughout the spectrum is constant during the acquisition. Some measurements, particularly in the field of neutron activation analysis, involve isotopes with half-lives shorter than the measurement interval. In this case, the count rates in some peaks are very high at the beginning of the measurement and then reduce as the isotope decays. Since the live timer measures the live time for the entire measurement interval, it can not correctly account for the large number of counts lost early in the measurement.

J. Harms, *Nucl. Instr. And Methods,* 53:192 (1967) describes a method for accurately determining the true count rate in spectra involving peaks from isotopes of differing half-lives. The central idea of the Harms method involves making an estimate of the ratio of the actual arrival rate of pulses to the measured rate, hereinafter referred to as the true-to-live ratio, r. When a photon is recorded, the appropriate channel is incremented by r. For example, if half of the counts are being lost during dead time intervals, then r is two. When the digitized value points to a memory channel, the channel contents are incremented by two instead of one. In effect, the lost count is accounted for by accumulating the measured count twice. Although this procedure might appear to be incorrect since the lost count did not necessarily have the same energy as the measured count, Masters and East, IEEE Trans. Nucl. Sci., 17, 383, showed that in typical spectra involving many thousands of counts, the resulting error is statistically small. Harms noted that r could be obtained from the spectrometer's true time and live time clocks.

Westphal (U.S. Pat. No. 4,476,384) improved on the Harms method by introducing the concept of a virtual pulse generator. The virtual pulses do not actually exist in the spectrum, which would cause errors, but are subject to the same dead times as real pulses. The pulses are counted in two counters, one continuous and one gated off during dead times. The gating off period is equal to the pulse processing time extended by a fixed interval equal to the pulse rise time. The ratio of the two counters gives an estimate of r and is used to increment memory just as in the Harms method.

Hereinafter, a method that corrects for counting losses by adding an increment other than one to memory is referred to as a differential correction method (DCM). The main advantage of a DCM is that it can correct for varying count rates in different peaks. A major problem with a DCM is the loss of statistical information. It is well known that counts in a non-corrected spectrum follow normal statistics. If the number of counts in a peak is C, the standard deviation of the counts is the square root of C. In a spectrum obtained using a DCM, the error is unknown and can not be deduced from the spectrum alone.

Accordingly, there is a need for a spectroscopy system which can both accurately determine the count rate for spectra containing peaks with differing decay times and maintain the necessary information about the spectra to allow the statistical error to be calculated.

It is the object of the invention to produce a spectroscopy system which can give correct counting rates for spectra containing peaks with differing decay times without losing statistical error information.

BRIEF SUMMARY OF THE INVENTION

It is not presently known how to estimate the error in a peak count C using only the information in the DCM corrected spectrum. However, in the present invention, two spectra, the DCM spectrum and an error spectrum, are simultaneously accumulated. The two spectra have the same size, true acquisition time, and energy calibration. The substantive difference between the spectra is in number of counts in each channel. In the DCM spectrum the selected channel is incremented by r when a count of that energy is measured. In the error spectrum the selected channel is incremented by $r^2$ when a count of that energy is measured. In the data analysis the best estimate of the number of counts in a given peak comes from the number of counts in the DCM corrected spectrum. The statistical error is obtained from the error spectrum, possibly corrected by other known factors obtained during the acquisition. The use of $r^2$ to obtain the error spectrum is justified in the detailed description of the invention.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
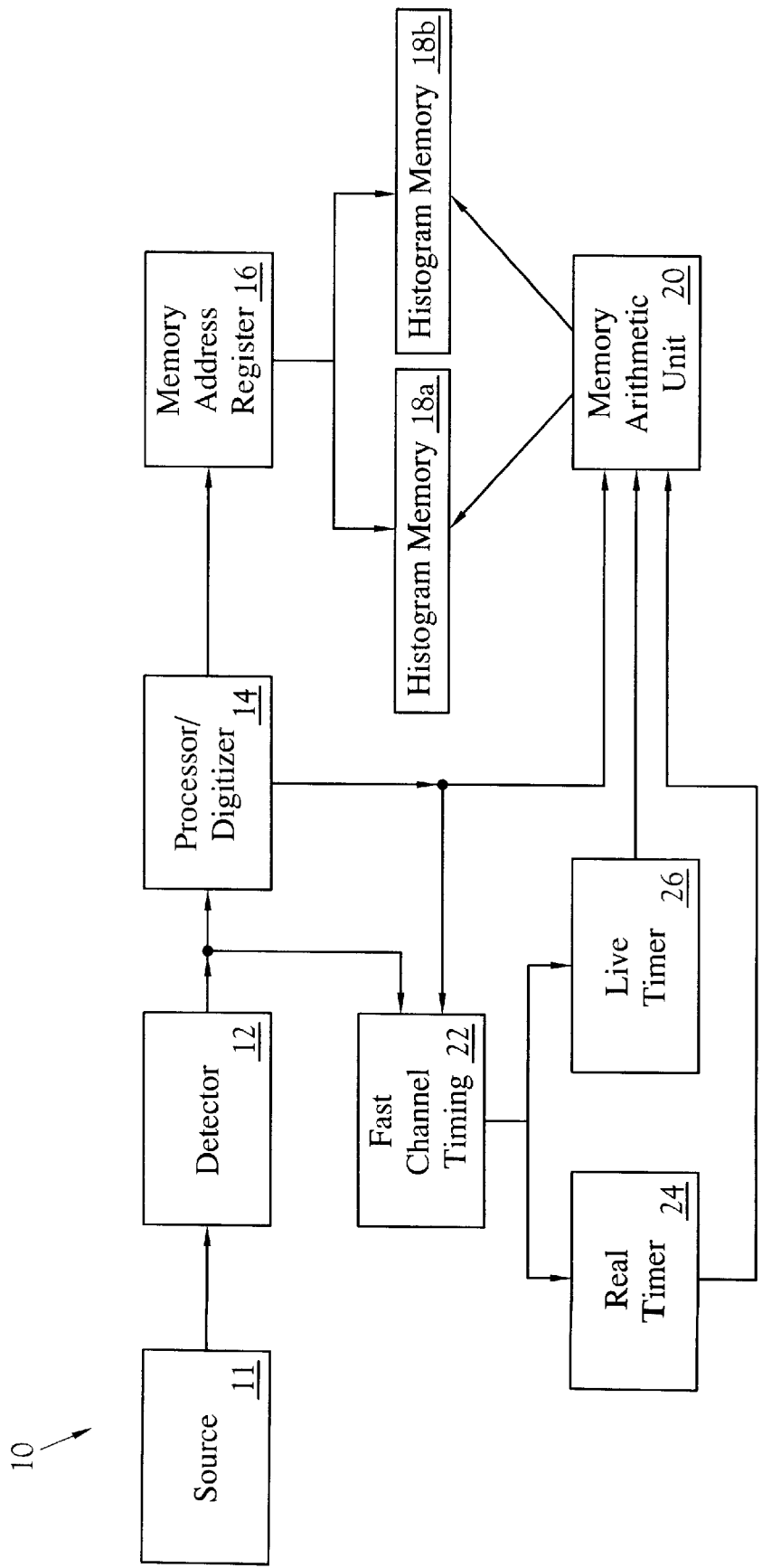
FIG. 1 is block diagram of the preferred embodiment of the invention wherein a first histogram memory contains a DCM corrected spectrum obtained by incrementing the first histogram memory by r when each count is recorded and a second histogram memory contains an error spectrum obtained by incrementing the second histogram memory by $r^2$.

In order to calculate the statistical error in the number of counts in a given peak in a spectrum, it is necessary to know the error in the total number of counts in any given channel. In a spectrum accumulated without using a DCM, the statistical variance in a given channel is equal to the number of counts in that channel. If the total number of counts in a spectrum peak is the sum of the counts in the channels comprising that peak, the variance in the total count is also the sum of the counts in the channels comprising that peak. The error in the count, termed the standard deviation, is the square root of the variance and thus the square root of the total number of counts in the peak. The variance in the counts in a given channel of a DCM corrected spectrum is not equal to the number of counts in that channel so the usual method of calculating errors does not apply.

In the preferred embodiment of the invention, the ratio r is calculated by the Gedcke-Hale technique. Two counters count a periodic source, called the clock. A counter that counts each tick of the clock gives the true time. The live time is given by a counter that counts up during intervals when a pulse is not being processed, counts down during the rising portion of the spectrometer output, and does not count during the falling portion of the spectrometer output. The ratio of the two counters gives the value r for use in the DCM. When the live time counter reaches a preset value, a new value for r is calculated. Since r is usually constrained to be an integer, the calculated value is truncated to an integer. The fractional portion is accumulated until an integer value is reached and used to correct the calculated r. Those skilled in the art will note that r must be updated after a preset time long enough to obtain good statistical accuracy but short enough to respond to changes in the system count rate.

The number of counts added to a channel during an interval is given by $$m_{ij} = r_j \cdot n_{ij} \quad (1)$$

where m represents the number of counts, i represents a given channel number, and j represents a given live time update interval. Note that $r_j$ is used to denote the value of r used during the $j^{th}$ time interval but is actually derived from the j−1 live time interval. Since m is the product of two random variables, the variance in m is calculated as $$\text{var}(m_{ij}) = \text{var}(r_j) \cdot \left(\frac{d}{dr_j} m_{ij}\right)^2 + \text{var}(n_{ij})\left(\frac{d}{dn_{ij}} m_{ij}\right)^2 \quad (2)$$

or $$\text{var}(m_{ij}) = \text{var}(r_j) \cdot (n_{ij})^2 + \text{var}(n_{ij}) \cdot (r_j)^2 \quad (3)$$

It is well known that the ratio of output to input count rates for a system with counting losses due to random pile-up, which is equivalent to r, is given by $$r_j = \exp(\tau \cdot N_j) \text{ where } \tau = \frac{t_m}{lt_j}, N_j = \sum_i n_{ij}, \quad (4)$$

$t_m$ is equal to the dead time per measurement, and $lt_j$ is equal to the live time update interval. Using the standard expression for the variance of a function of a random variable produces $$\text{var}(r_j) = \text{var}(N_j) \cdot \left(\frac{d}{dN_j} r_j\right)^2 \quad (5)$$

but as the variance of $N_j$ is just $N_j$, the expression becomes $$\text{var}(r_j) = N_j \cdot \tau^2 \cdot \exp(2 \cdot \tau \cdot N_j) \quad (6)$$

or $$\text{var}(r_j) = N_j \cdot \tau^2 \cdot (r_j)^2 \quad (7)$$

Substituting the relationship of Equation 7 into Equation 3 produces $$\text{var}(m_{ij}) = N_j \cdot \tau^2 \cdot (r_j)^2 \cdot (n_{ij})^2 + n_{ij} \cdot (r_j)^2 \quad (8)$$

or $$\text{var}(m_{ij}) = (r_j)^2 \cdot n_{ij} \cdot (1 + \tau \cdot N_j \cdot n_{ij}) \quad (9)$$

The random variables $N_j$ and $n_{ij}$ may be different for each energy channel i and time interval j but by taking the maximum values of these variables for the entire time of the data acquisition, $\max(N_j)$ and $\max(n_{ij})$, and making the substitution $$f = 1 + \tau^2 \cdot \max(N_j) \cdot \max(n_{ij}) \quad (10)$$

the upper bound for the variance in $m_{ij}$ in Equation 9 becomes $$\text{var}(m_{ij}) = (r_j)^2 \cdot n_{ij} \cdot f \quad (11)$$

Then, with $M_i$ being the variance in the total number of counts in channel i at the end of data acquisition, the variance in $M_i$ is sum of the variances in $m_{ij}$, thus $$\text{var}(M_i) = f \cdot \sum_j (r_j)^2 \cdot n_{ij} \quad (12)$$

Therefore, an estimate of the variance in the number of counts in a given channel i is accumulated in an error spectrum obtained by adding $r_j^2$ to each channel i in a process similar to that of adding $r_j$ to channel i to obtain the DCM corrected spectrum. The estimate is accurate when the correction factor f is close to unity. It may be shown that f is close to unity for most conditions of data acquisition and can be calculated if required.

Rewriting the equation for the correction factor f as $$f = 1 + \left[\tau \cdot (\max(N)_j) \cdot \left(l_m \cdot \frac{\max(n_{ij})}{lt_j}\right)\right] \quad (13)$$

and using $r_j = \exp(\tau \cdot N_j)$, the first term inside the brackets in Equation 13 is calculated as the natural logarithm of the maximum value of $r_j$ observed during the acquisition. At a very high count rate with a dead time of 90%, this term is the natural logarithm of 10, or 2.3.

The last term in Equation 13 contains the maximum counting rate for a single channel observed during data acquisition. Since the spectrum typically contains many thousands of channels, this number is usually very small. In the special case of a very strong peak from a rapidly decaying isotope, this term is calculated from the known values of the decay time constant and the observed average counting rate. If the decay time constant is short compared to the acquisition time, the number of counts in channel i, $M_i$, is equal to the maximum counting rate multiplied by the decay time constant. The maximum count rate is then just $M_i$ divided by the decay time constant. A similar calculation can be made for any ratio of the decay time constant to the acquisition time. The problem of calculating the error in the DCM spectrum is thus reduced to accumulating the error spectrum and calculating a correction factor from known values.

FIG. 1 shows a block diagram of the preferred embodiment of a spectroscopy system 10 according to the present invention. A source of radiation 11 emits radiation of differing energies and varying rates. An example of such a radiation field are gamma rays emitted from a mixture of radioactive isotopes. A radiation detector 12, such as a high purity germanium gamma ray detector, absorbs the radiation and gives a signal proportional to the energy. In the example of the germanium detector, the detector 12 produces a pulse of current whose integral is proportional to the energy absorbed by the germanium crystal. The signal is amplified, filtered, and its amplitude digitized by a processor/digitizer 14, such as an analog filter amplifier followed by an analog-to-digital converter (ADC) or, preferably, a digital system based on a fast sampling ADC and digital signal processing techniques. The digitized amplitude is stored in a memory address register (MAR) 16. The MAR 16 is typically 14-bits wide and thus capable of addressing 16-kilowords of memory. A pair of histogram memories 18a, 18b is included. It is convenient, but not necessary, that the two histogram memories 18a, 18b are identical. Each histogram memory 18a, 18b typically consists of 16-kilowords of memory with each word typically 32-bits wide. When the processor/digitizer 14 signals that a valid pulse has been processed, a memory arithmetic unit (MAU) 20 causes the memory location addressed by the MAR 16 to be incremented by the desired increment. This process typically continues until many thousands of pulses have been processed. The data in each histogram memory 18a, 18b is then a record, or spectrum, of the total number of counts as a function of the gamma ray energy according to the collection method.

In the first histogram memory 18a, a DCM spectrum is collected. Each time that a valid pulse is processed, the MAU 20 calculates the true-to-live ratio, r, and adds that number to the memory location addressed by the MAR 16. For example, if the system dead time is fifty percent, then the ratio is two (2). Half of the pulses are being lost to the system dead time but each detected pulse is counted twice. The count rate in a given peak is the total number of counts in the peak divided by the true time. Using a DCM gives the same results as the conventional method of incrementing the memory by one if the spectrum shape is constant, but gives much more accurate results when one or more peaks have rapidly changing count rates. However, the number of counts in the peak does not follow normal statistics. Accordingly, no estimate of the statistical error can be made from the spectrum alone.

When using a DCM it is necessary to deal with fractional counts. In the example given above the increment value is two (2). In the general case, r will not be an integer but will have a fractional part. It would be possible to record the spectrum using fixed point or floating point numbers but normally integers are used. The usual method used is to increment memory by the truncated integer portion of r and use a separate memory or register to accumulate the unused fractions. When the value accumulated in the fraction register exceeds an integer value, that value is used the next time the memory is incremented.

The second histogram memory 18b collects the error spectrum. For the error spectrum, the memory location addressed by the MAR 16 is incremented by $r^2$. As previously shown, incrementing by $r^2$ provides an estimate of the variance in the number of counts in a given channel i. The best estimate of the variance in the number of counts in the peak is the sum of the counts in the corresponding channels in the error spectrum, corrected by the factor f if required.

Figure 2:
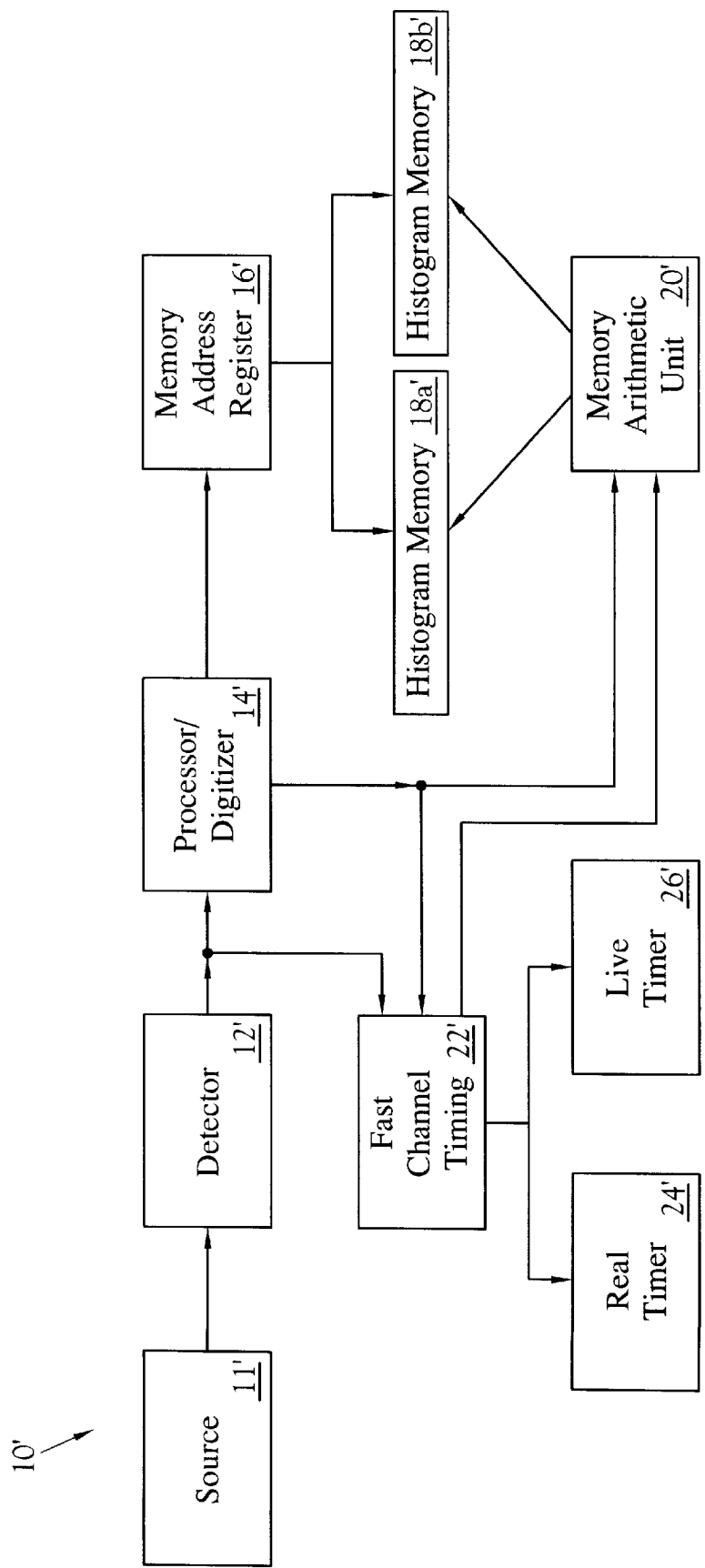
FIG. 2 is a block diagram of an alternate embodiment of the invention wherein the first histogram memory contains the DCM corrected spectrum obtained by incrementing the first histogram memory by r, with r being the true number of counts seen by the detector since the last recorded count as determined by the fast channel timing, and the second histogram memory contains the error spectrum obtained by incrementing the second histogram memory by $r^2$.

FIG. 2 shows a block diagram of an alternate embodiment of a spectroscopy system according to the present invention. The second histogram memory 18b' collects the error spectrum by incrementing the memory location addressed by the MAR 16' by $r^2$. The first histogram memory 18a' collects a DCM spectrum using a different DCM from that of FIG. 1. When a pulse is processed, r is equal to one plus the number of pulses lost since the last pulse was processed. This number is obtained by counting the pulses detected by the fast channel timing system 22'. If the fast channel timing system 22' can count all pulses with no dead time, accurate results are obtained. Serious errors can result if there are many pulses with amplitudes too small to be counted. Again, no estimate of the statistical counting errors can be made from the DCM spectrum in the first histogram memory 18a'.

By simultaneously obtaining two spectra, one being a DCM spectrum and the other being an error spectrum, it is possible to accurately determine the count rate for spectra containing peaks with differing decay times and retain the necessary information about the spectra to allow the statistical error to be calculated.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A spectroscopy system comprising:
   a detector for detecting radiation pulses emitted from a sample being analyzed, said detector producing an output signal representative of a measured amplitude of each said detected radiation pulse;
   a true timer for measuring a true time period corresponding to a differential data acquisition cycle;
   a live timer for measuring a live time period corresponding to the differential data acquisition cycle minus a period of time while each said output signal is processed;
   a processing device electrically connected to said true timer and said live timer, said processing device for calculating a true-to-live ratio of said first time period and said second time period;
   a signal processor in electrical communication with said detector, said signal processor for conditioning said output signal as a processed signal;
   an analog-to-digital converter in electrical communication with said signal processor for producing a digital representation of said processed signal, said digital representation serving as a pointer; and
   a plurality of histogram memories electrically connected to said processing device and said detector, said plurality of histogram memories including at least a first histogram memory being incremented by said true-to-live ratio at a memory location addressed by said pointer and a second histogram memory being incremented by said true-to-live ratio squared at the memory location addressed by said pointer.

2. The spectroscopy system of claim 1 wherein said true-to-live ratio is equal to said true time period divided by said live time period.

3. The spectroscopy system of claim 1 further comprising a fast channel timing unit in electrical communication with said detector, said fast channel timing unit counting each said detected radiation pulse.

4. The spectroscopy system of claim 3 wherein said true-to-live ratio is equal to a number of pulses counted by said fast channel timing unit since the last said detected radiation pulse was processed.

5. The spectroscopy system of claim 1 wherein each said detected radiation pulse has a start, a peak, and an end, said live timer being counted backward from said pulse start until said pulse peak and said live timer being not counted from said pulse peak until said pulse end.

6. The spectroscopy system of claim 1 further comprising a fraction register for accumulating a fractional component of said true-to-live ratio, said true-to-live ratio being truncated to an integer.

7. The spectroscopy system of claim 6 wherein when said fraction register contains an integer component, said fraction register integer component being summed with said true-to-live ratio.

8. The spectroscopy system of claim 1 wherein said signal processor includes at least an amplifier, a filter, and an analog-to-digital converter.

9. The spectroscopy system of claim 1 wherein said signal processor includes an amplifier and a digital signal processor.

10. A method of providing spectrum information including both an accurate count rate and a statistical error calculation for a spectroscopy system, said method comprising the steps of:
    (a) producing an output signal representative of a measured amplitude of a detected radiation pulse;
    (b) timing a true time period corresponding to a differential data acquisition cycle of a spectrometer;
    (c) timing a live time period corresponding to the differential data acquisition cycle minus a period of time while said output signal is processed;
    (d) calculating a true-to-live ratio of said true time period and said live time period;
    (e) creating a first amplitude histogram of said true-to-live ratio for said output signal;
    (f) creating a second amplitude histogram of said true-to-live ratio squared for said output signal;
    (g) determining a count rate representative of the number of detected radiation pulses from said first amplitude histogram;
    (h) determining a statistical error calculation from said second amplitude histogram; and
    (i) providing spectrum information including both said count rate and said statistical error calculation.

11. The method of claim 10 wherein said true-to-live ratio is equal said true time period divided by said live time period.

12. The method of claim 10 further comprising the step of counting each said detected radiation pulse as a total number of pulses.

13. The method of claim 12 wherein said true-to-live ratio is equal to said total number of pulses since the last said detected radiation pulse was processed.

14. The method of claim 10 wherein each said detected radiation pulse has a start, a peak, and an end, further comprising the steps of:
    (a) counting said live time period backward from said pulse start until said pulse peak; and
    (b) pausing said live time period from said pulse peak until said pulse end.

15. The method of claim 10 further comprising the steps of:
    (a) accumulating a fractional component of said true-to-live ratio as an accumulation defining an integer component and a fractional component; and
    (b) truncating said true-to-live ratio to an integer.

* * * * *